(12) United States Patent
Selvam (10) Patent No.: US 11,584,456 B2
(45) Date of Patent: Feb. 21, 2023

(54) UNDERCARRIAGE ASSEMBLY FOR A MACHINE

(71) Applicant: Caterpillar Global Mining Equipment LLC, Denison, TX (US)

(72) Inventor: Sudhagar Selvam, Chennai (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 533 days.

(21) Appl. No.: 16/718,370

(22) Filed: Dec. 18, 2019

(65) Prior Publication Data

US 2021/0024148 A1    Jan. 28, 2021

(30) Foreign Application Priority Data

Jul. 26, 2019   (IN) .............................. 201911030250

(51) Int. Cl.
| | |
|---|---|
| *B62D 55/116* | (2006.01) |
| *B62D 55/112* | (2006.01) |
| *E21B 7/02* | (2006.01) |
| *B62D 55/10* | (2006.01) |
| *B62D 33/067* | (2006.01) |

(52) U.S. Cl.
CPC ............ *B62D 55/116* (2013.01); *B62D 55/10* (2013.01); *B62D 55/112* (2013.01); *E21B 7/024* (2013.01); *B62D 33/067* (2013.01)

(58) Field of Classification Search
CPC ...... B62D 55/00; B62D 55/08; B62D 55/104; B62D 55/116; B62D 55/10; B62D 55/112; B62D 33/067; B62D 33/063; E21B 7/024
See application file for complete search history.

(56) References Cited

U.S. PATENT DOCUMENTS

| | | | |
|---|---|---|---|
| 4,492,507 A | 1/1985 | Landoll | |
| 5,337,847 A * | 8/1994 | Woods ................. | A01G 23/083 180/41 |
| 6,105,699 A | 8/2000 | Hinds | |
| 6,158,539 A | 12/2000 | Isley | |

(Continued)

FOREIGN PATENT DOCUMENTS

| | | |
|---|---|---|
| CN | 206053849 U | 3/2017 |
| CN | 207879251 U | 9/2018 |

(Continued)

*Primary Examiner* — Jacob D Knutson
*Assistant Examiner* — Abigail R Hymel
(74) *Attorney, Agent, or Firm* — von Briesen & Roper, s.c.

(57) ABSTRACT

A levelling assembly is provided, for levelling an upper carriage assembly of a machine with respect to an undercarriage assembly having a first track roller frame and the second track roller frame. A levelling body is rotatably coupled to the first track roller frame and the second track roller frame and defines a first side and a second side laterally opposite to the first side. The levelling assembly includes a first pair of fluid actuators for movably coupling first side of the levelling body with the first track roller frame and a second pair of fluid actuators for movably coupling second side of the levelling body with the second track roller frame. The first and the second pair of fluid actuators move the levelling body between a fore tilted position and an aft tilted position relative to the first and the second track roller frames.

17 Claims, 9 Drawing Sheets

(56) References Cited

U.S. PATENT DOCUMENTS

| | | | |
|---|---|---|---|
| 6,173,973 B1 * | 1/2001 | Robinson | E02F 9/028 |
| | | | 180/41 |
| 6,394,734 B1 | 5/2002 | Landoll | |
| 6,609,581 B2 | 8/2003 | Vaile | |
| 9,810,024 B2 | 11/2017 | Koka | |
| 10,184,295 B2 | 1/2019 | Marek et al. | |
| 10,220,921 B1 * | 3/2019 | McConnell | B66C 23/44 |
| 2007/0152438 A1 * | 7/2007 | Lacher | B62D 21/186 |
| | | | 280/781 |
| 2009/0115148 A1 * | 5/2009 | Kim | E02F 9/028 |
| | | | 280/6.154 |
| 2009/0118913 A1 * | 5/2009 | O'Halloran | E02F 9/028 |
| | | | 701/50 |
| 2009/0157265 A1 | 6/2009 | Kim et al. | |
| 2009/0314566 A1 | 12/2009 | Rust | |
| 2010/0264694 A1 * | 10/2010 | Crawford | E02F 9/028 |
| | | | 296/190.05 |
| 2016/0362149 A1 * | 12/2016 | Erlinger | E02F 9/2257 |

FOREIGN PATENT DOCUMENTS

| | | | | |
|---|---|---|---|---|
| DE | 102007020571 | | 11/2008 | |
| DE | 102016102713 | | 4/2018 | |
| JP | 0867277 | | 3/1996 | |
| WO | WO-0246539 A1 * | 6/2002 | | B62D 33/063 |
| WO | WO-2019129931 A1 * | 7/2019 | | B62D 33/063 |

\* cited by examiner

UNDERCARRIAGE ASSEMBLY FOR A MACHINE

TECHNICAL FIELD

The present disclosure generally relates to an undercarriage assembly for a machine, such as a surface mining drill machine, and more particularly, to the undercarriage assembly for levelling and rotating an upper carriage assembly relative to the undercarriage assembly.

BACKGROUND

Surface mining drill machines are commonly known to drill a borehole, such as for digging water wells, oil wells, construction foundations, etc. Such drill machines are often required to operate on inclined and/or uneven surface terrains. Conventionally, when an undercarriage assembly of the drill machine is tilted on an inclined surface, an upper carriage assembly including the operator cabin are also accordingly tilted, thereby making an operator, positioned inside the operator cabin, also sit in the inclined position. Typically, a single drilling operation may last for up to 30 minutes or even higher, and in such situations, the operator would have to sit in the inclined position for the entire duration of operation, which is not desired.

Further, swivel systems are known to facilitate swing and rotation of the upper carriage assembly relative to the undercarriage assembly. However, such swivel systems are typically, hydraulically operated and include multiple hoses for supplying hydraulic fluid. These hoses tend to get intertwined when the swivel system operates to rotate the upper carriage assembly relative to the undercarriage. Therefore, the swing and a degree of rotation of the upper carriage assembly relative to the undercarriage assembly is typically restricted to a few degrees, e.g., up to 270 degrees from a point of rotation start. Furthermore, a combination of levelling mechanisms for levelling the upper carriage assembly during operation and the swivel systems in drill machines are not known, as they result in an increased height and size of the drill machines, which is again not desired.

For example, Chinese Patent Publication No. 207879251 (hereinafter referred to as the '251 publication) provides an open-air rig that includes a first cantilever crane subassembly, a second cantilever crane subassembly, cantilever crane support component and the assembly of getting on the bus. First cantilever crane subassembly and second cantilever crane subassembly respectively with cantilever crane, support component swing joint, the cantilever crane support component is arranged on the assembly of getting on the bus.

SUMMARY OF THE INVENTION

In an aspect of the present disclosure, a levelling assembly is provided. The levelling assembly is for levelling an upper carriage assembly of a machine with respect to an undercarriage assembly of the machine. The undercarriage assembly includes a first track roller frame and a second track roller frame. The levelling assembly further includes a levelling body rotatably coupled to the first track roller frame and the second track roller frame. The levelling body defines a first side and a second side laterally opposite to the first side. Further, the levelling assembly includes a first pair of fluid actuators for movably coupling first side of the levelling body with the first track roller frame and a second pair of fluid actuators for movably coupling the second side of the levelling body with the second track roller frame. The first and the second pair of fluid actuators are configured to move the levelling body between a fore tilted position and an aft tilted position relative to the first and the second track roller frames.

In another aspect of the present disclosure, an undercarriage assembly, for a machine having an upper carriage assembly, is provided. The undercarriage assembly includes a first track roller frame, a second track roller frame, a levelling assembly and a swivel system. The levelling assembly includes a levelling body being rotatably coupled to the first track roller frame and the second track roller frame and defining a first side and a second side laterally opposite to the first side. Further, the levelling assembly includes a first pair of fluid actuators for movably coupling the first side of the levelling body with the first track roller frame and a second pair of fluid actuators for movably coupling the second side of the levelling body with the second track roller frame. The first and the second pair of fluid actuators are configured to move the levelling body between a fore tilted position and an aft tilted position relative to the first and the second track roller frames. Furthermore, the swivel system is positioned within the levelling assembly. The swivel system includes a first swivel portion and a second swivel portion being rotatable with respect to the first swivel portion. The second swivel portion is connected to and configured to rotate the upper carriage assembly relative to the undercarriage assembly.

In a yet another aspect of the present disclosure, a machine is provided. The machine includes an undercarriage assembly and an upper carriage assembly rotatably mounted on the undercarriage assembly. The undercarriage assembly includes a first track roller frame and a second track roller frame. The machine further includes a levelling assembly for levelling the upper carriage assembly with respect to the undercarriage assembly and a swivel system for facilitating 360 degrees rotation of the upper carriage assembly with respect to the undercarriage assembly. The levelling assembly includes a levelling body being rotatably coupled to the first track roller frame and the second track roller frame and defining a first side and a second side laterally opposite to the first side. The levelling body further includes a first bracket provided on the first side and a second bracket provided on the second side. Further, the levelling assembly includes a first pair of fluid actuators for movably coupling the first side of the levelling body with the first track roller frame and a second pair of fluid actuators for movably coupling the second side of the levelling body with the second track roller frame. The first and the second pair of fluid actuators are configured to move the levelling body between a fore tilted position and an aft tilted position relative to the first and the second track roller frames. Furthermore, the swivel system is positioned within the levelling assembly. The swivel system includes a first swivel portion and a second swivel portion being rotatable with respect to the first swivel portion. The swivel system also includes one or more hoses connected to the first swivel portion for supplying hydraulic fluid to the swivel system. The second swivel portion is connected to and configured to rotate the upper carriage assembly relative to the undercarriage assembly in response to a hydraulic fluid actuation received from the one or more hoses.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
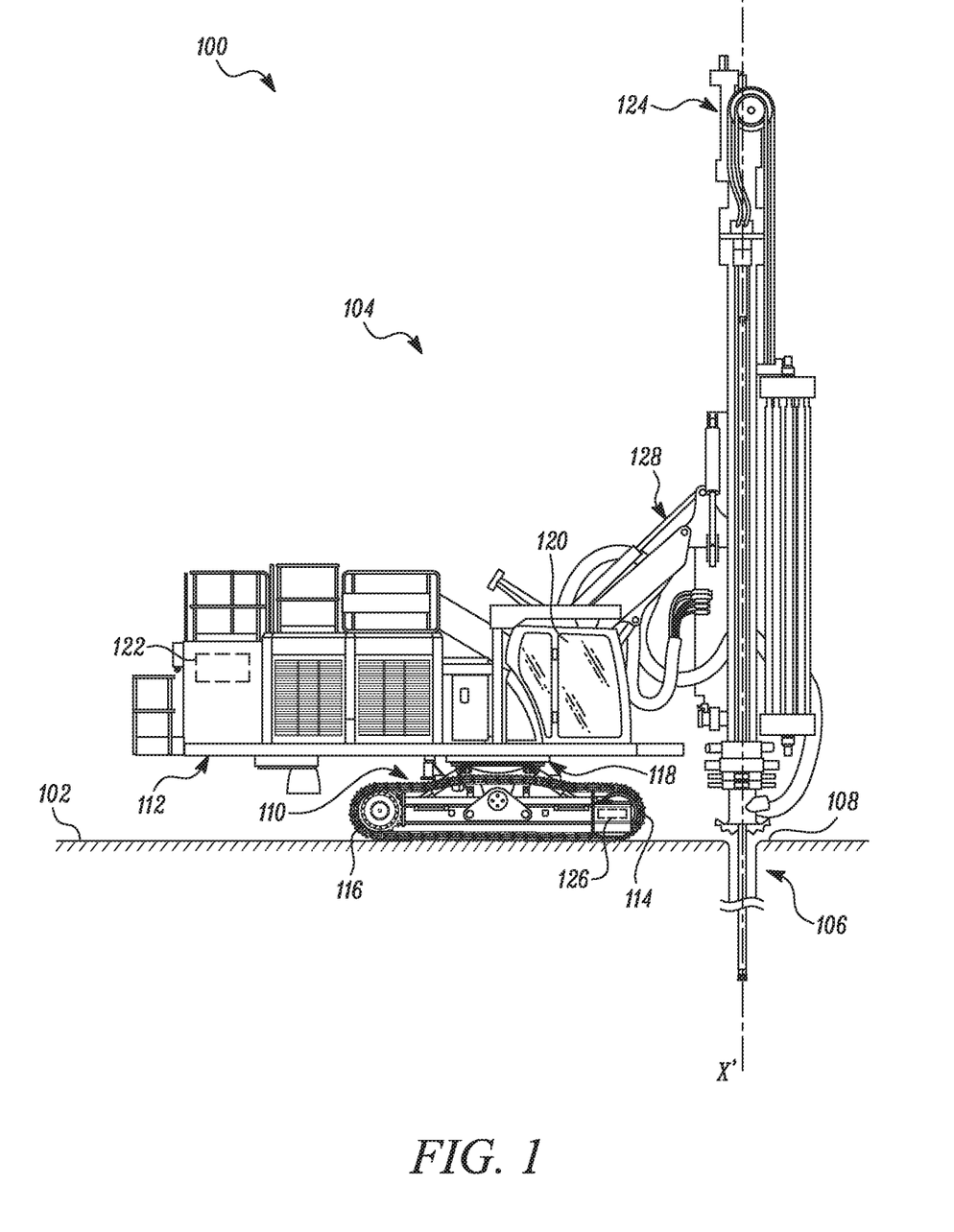
FIG. 1 illustrates an exemplary machine, in accordance with embodiments of the present disclosure.

FIG. 1 illustrates an exemplary machine 100 operating at a worksite 102. The worksite 102 may include, for example, a mine site, a quarry, a construction site, or any other type of worksite. As illustrated, the machine 100 is embodied as a surface mining rotary drill machine 104 and may include a rotary drill or a blast hole drill. The machine 100 may include a drill assembly 106 for drilling or otherwise forming holes, channels, tunnels or openings into, within, and/or extending into, and/or below, a work surface 108 of the worksite 102. For example, the drill assembly 106 may include a drill bit configured to drill holes vertically, horizontally or at a suitable angle with respect to the ground at the worksite 102. Such drill assembly may be utilized for sub-surface mineral extraction, such as, oil or natural gas; mineral exploration or environmental exploration drilling; hydraulic fracturing; oil, gas, and/or water extraction wells; rock cut drilling for mining and/or quarrying operations; and the like. In some embodiments, the machine 100 may be a machine having various levels of autonomy, such as a fully autonomous machine, a semi-autonomous machine, and/or a remotely operated machine.

Figure 2:
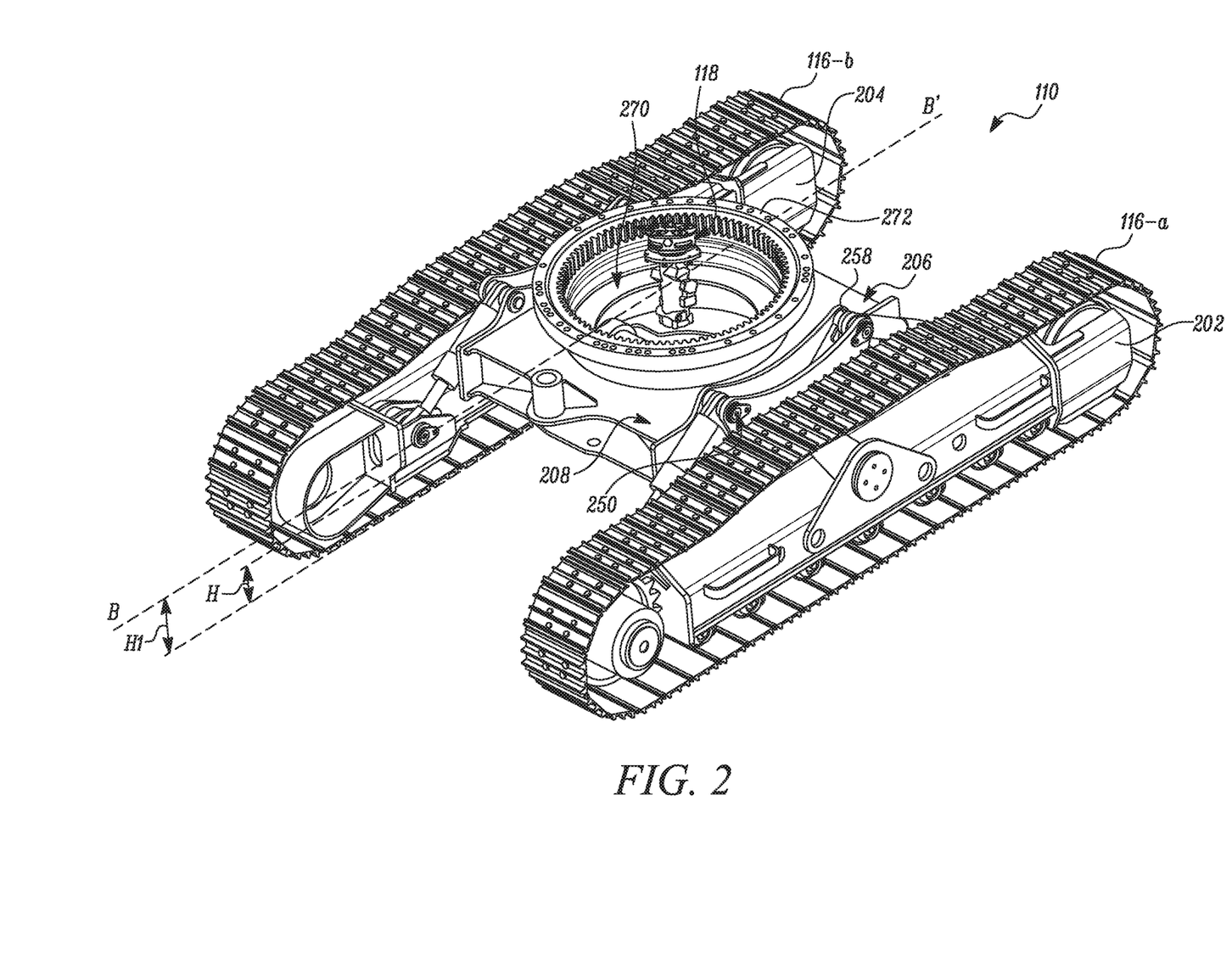
FIG. 2 illustrates an exemplary undercarriage assembly having a levelling assembly for the machine, in accordance with the embodiments of the present disclosure.

The machine 100 includes an undercarriage assembly 110 and an upper carriage assembly 112 rotatably mounted on the undercarriage assembly 110. As illustrated in FIG. 1, the undercarriage assembly 110 includes a pair of ground engaging members 114 (only one side shown in FIG. 1) for propelling the machine 100 at the worksite 102. Although, the ground engaging members 114 are illustrated as endless crawler tracks 116 (116-a, 116-b as shown in FIG. 2), it may be contemplated that any other type of ground engaging members, such as wheels, may also be used to propel the machine 100 at the worksite 102.

The upper carriage assembly 112 is configured to rotate relative to the undercarriage 110. In various embodiments, the upper carriage assembly 112 may be rotatably mounted on the undercarriage assembly 110 via use of a swivel system 118 (as shown in FIG. 2) provided on the undercarriage assembly 110. Details regarding the swivel system 118 will be discussed later in the description. The upper carriage assembly 112 is configured to support various components/systems of the machine 100, such as an operator cab 120, a power source 122, a mast 124, the drill assembly 106 and one or more auxiliary systems (not shown) of the machine 100.

The operator cab 120 is an enclosure where an operator of the machine 100 may be positioned. Further, the operator cab 120 may include one or more of electronic panels, displays, buttons, joysticks, and/or various other actuable components configured to operate one or more components/systems of the machine 100. Furthermore, the power source 122 may be in the form of an engine and/or an electric motor configured to produce torque to operate the various components/systems of the machine 100. For example, the power source 122 may be a diesel engine, or any other type of engine running on solid, liquid or gaseous fuel. While only one power source 122 is depicted in the figures, it may be contemplated that the machine 100 may include multiple power sources for powering the various components of the machine 100.

The machine 100 may further include a propulsion system 126 provided in the undercarriage assembly 110 and operatively connected to the power source 122. The propulsion system 126 may include motors, transmission shafts, gears, differential systems, axles, idler wheels, and the like coupled to the ground engaging assembly 114 of the machine 100. Such components of the propulsion system 126 may be configured to receive some amount of torque from the power source 122 to move the ground engaging members 114 on the worksite 102.

The mast 124 is mounted on the upper carriage 112 of the machine 100. The mast 124 (may also be referred to as a derrick or tower) may be movable relative to the upper carriage 112 between a substantially vertical position and a non-vertical position via use of a mast shift cylinder 128. It can be contemplated that the mast shift cylinder 128 may be adapted to facilitate alignment of the mast 124 along a height and a width of the upper carriage 112. Varying the position of the mast 124 (via the mast shift cylinder 128) may allow changing or repairing components of the drill assembly 106 or of the upper carriage assembly 112 or the undercarriage assembly 110. The mast 124 may be a linearly extending structure, and in the exemplary embodiment and configuration of the machine 100, as illustrated in FIG. 1, is upright, extending along a longitudinal axis X-X'.

Figure 3:
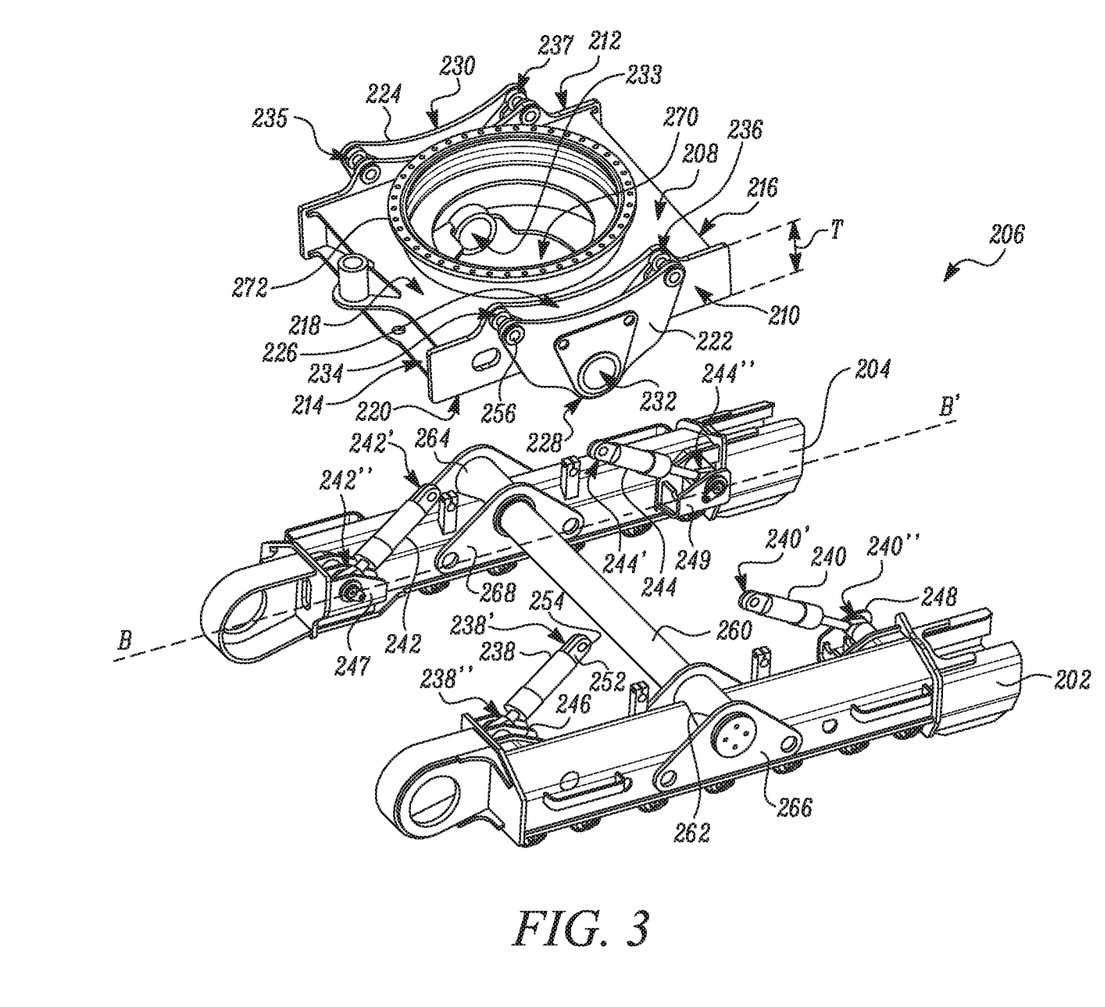
FIG. 3 illustrates an exploded view of the exemplary levelling assembly, in accordance with the embodiments of the present disclosure.

Referring to FIGS. 2 and 3, the undercarriage assembly 110 of the machine 100 is illustrated, in accordance with various embodiments of the present disclosure. The undercarriage assembly 110 includes a first track roller frame 202 having the first crawler track 116-a mounted thereon and a second track roller frame 204 having the second crawler track 116-b mounted thereon. The track roller frames, and the crawler tracks are well known in the art and are therefore, not explained in greater detail for the sake of brevity of the present disclosure. It may be well contemplated that the crawler tracks and the track roller frames may be replaced suitably to achieve similar results as that of the present disclosure, without deviating from the scope of the present disclosure.

In an embodiment of the present disclosure, the undercarriage assembly 110 includes a levelling assembly 206 for levelling the upper carriage assembly 112 with respect to the undercarriage assembly 110, when the machine 100 operates on an inclined or uneven surface at the worksite 102. The levelling assembly 206 is configured to tilt the upper carriage assembly 112 with respect to the undercarriage assembly 110 to keep the upper carriage assembly in a horizontal position, when the machine 100 operates at the inclined surface of the worksite 102.

According to an embodiment of the present disclosure, the levelling assembly 206 includes a levelling body 208 rotatably coupled with respect to each of the first track roller frame 202 and the second track roller frame 204. The levelling body 208 defines a first side 210 and a second side 212 laterally opposite to the first side 210 (as shown in FIG. 3). Further, the levelling body 208 defines a third side 214 and a fourth side 216 laterally opposite to the third side 214. The third side 214 and the fourth side 216 may be perpendicular to each of the first side 210 and the second side 212, as shown in FIGS. 2 and 3. Furthermore, the levelling body 208 includes an upper surface 218 and a lower surface 220 defining a thickness T of the levelling body 208. It may be contemplated that the upper surface 218 of the levelling body 208 interfaces with the upper carriage assembly 112 of the machine 100, whereas the lower surface 220 is configured to face the ground of the worksite 102.

The levelling body 208 further includes a first bracket 222 provided on the first side 210 and a second bracket 224 provided on the second side 212. In one example, each of the first bracket 222 and the second bracket 224 may be affixed with the respective first side 210 and the second side 212 of the levelling body 208 by using coupling mechanisms, such as welding. Alternatively, the one or more of the first bracket 222 and the second bracket 224 may be formed integrally with the levelling body 208 of the levelling assembly 206. As illustrated in FIGS. 2 and 3, the first side 210 of the levelling body 208 is rotatably coupled to the first track roller frame 202 via the first bracket 222. Similarly, the second side 212 of the levelling body 208 is rotatably coupled to the second track roller frame 204 via the second bracket 224. The detailed explanation of the rotatable coupling of the levelling body 208 with the track roller frames 202 and 204 is described in the following paragraphs of the present disclosure.

As shown in FIGS. 2 and 3, each of the first bracket 222 and the second bracket 224 is a U-shaped bracket having an upper end and a lower end. For example, as shown in FIG. 3, the first bracket 222 includes an upper end 226 and a lower end 228, whereas, similarly, the second bracket 224 includes the upper end 230 and a lower end (not shown). In an embodiment of the present disclosure, the first bracket 222 includes a receptacle 232 provided in the lower end 228, and a first coupling member 234 and a second coupling member 236 provided on the upper end 226. Similarly, the second bracket 224 includes a receptacle 233 provided in the lower end and a first coupling member 235 and a second coupling member 237 provided on the upper end 230.

In an embodiment of the present disclosure, the levelling assembly 206 includes a first pair of fluid actuators (including a first fluid actuator 238 and a second fluid actuator 240) and a second pair of fluid actuators (including a third fluid actuator 242 and a fourth fluid actuator 244) for movably coupling the levelling body 208 to each of the first track roller frame 202 and the second track roller frame 204, respectively. As illustrated in FIG. 3, the second fluid actuator 240 and the fourth fluid actuator 244 are positioned opposite to the first fluid actuator 238 and the third fluid actuator 242, respectively. In various embodiments of the present disclosure, the fluid actuators 238, 240, 242 and 244 may be hydraulic or pneumatic actuators having a standard piston and cylinder arrangement.

As shown in FIG. 3, each of the first and the second fluid actuators 238, 240 defines a top end 238', 240' and a lower end 238", 240", such that the top ends 238', 240' are connected to the respective first coupling member 234 and the second coupling member 236 on the upper end 226 of the first bracket 222. Further, the first track roller frame 202 includes a pair of complimentary mounting members 246, 248 configured to couple with the lower ends 238", 240" of the respective first and the second fluid actuators 238, 240. Similarly, the third and the fourth fluid actuators 242, 244 also define their respective top ends 242', 244' and lower ends 242", 244", such that the top ends 242', 244' are connected with the respective coupling members 235, 237 on the upper end 230 of the second bracket 224. The second track roller frame 204 also includes a pair of complimentary mounting members 247, 249 configured to couple with the lower ends 242", 244" of the respective third and the fourth fluid actuators 242, 244.

In an exemplary embodiment of the present disclosure, the top ends, such as the top end 238' of the first fluid actuator 238, are coupled to the respective coupling members, such as the first coupling member 234 provided on the first bracket 222, by a removable coupling mechanism 250 (as shown in FIG. 2). The removable coupling mechanism 250 is configured to facilitate rotational movement of the first fluid actuator 238 with respect to the first bracket 222. In one example, the removable coupling mechanism 250 may be a pin-joint mechanism.

As illustrated in FIG. 3, the first fluid actuator 238 may include a coupling member 252 provided at the top end 238'. The coupling member 252 may include a through receptacle 254 configured to align with complimentary receptacles 256 of the first coupling member 234 provided on the first bracket 222. A fastener member 258, such as a pin, is configured to be received through the aligned receptacles 254 and 256 for rotatably coupling the first fluid actuator 238 with the first bracket 222. It may be contemplated that the other fluid actuators of the levelling assembly 206 are also connected to their respective coupling members provided on the respective brackets, by using similar coupling mechanisms. However, it may also be contemplated that each of the fluid actuators may also be coupled using different coupling mechanisms to achieve similar results, without deviating from the scope of the claimed subject matter.

In an exemplary embodiment of the present disclosure, the lower ends 238", 240", 242", and 244" of the fluid actuators 238, 240, 242, 244 are positioned at a height H equal to or less than a height H1 of a longitudinal axis B-B' of each of the first and the second track roller frames 202, 204, with respect to the ground level at the worksite 102.

The levelling assembly 206 further includes a connecting rod 260 having a first end 262 and a second end 264. The connecting rod 260 is configured to be received through the receptacle 232 provided on the first bracket 222 and the receptacle 233 provided on the second bracket 224 and further connect to the first track roller frame 202 at the first end 262 and to the second track roller frame 204 at the second end 264. In an embodiment of the present disclosure, the levelling body 208 is configured to pivot about the connecting rod 260. As shown in FIG. 3, the first track roller frame 202 may include a connecting port 266 to connect (e.g., fixedly) to the first end 262 of the connecting rod.

Similarly, the second track roller frame 206 may include a connecting port 268 to connect (e.g., fixedly) to the second end 264 of the connecting rod 260.

The levelling body 208 further includes a swing receptacle 270 extending through the thickness T and having a slew ring 272 mounted thereon. Further, as shown in FIG. 2, the swing receptacle 270 is configured to receive the swivel system 118 therein. The upper carriage assembly 112 is configured to be mounted on the swing receptacle 270. The working of the swivel system 118 is further described in greater detail with reference to FIG. 5 of the description.

Further, the slew ring 272 is configured to be coupled with a corresponding complimentary coupling member, such as a ring gear 273 (shown in FIG. 6) provided on the upper carriage assembly 112. For example, the ring gear 273 may define a surface 274 having a number of internally threaded openings 276 disposed along a periphery of the ring gear 273. The threaded openings 276 of the ring gear 273 are configured to coaxially align with corresponding openings 278 provided on the slew ring 272 and receive fasteners 280, such as bolts, therein to couple the slew ring 272 and the ring gear 273 together. Further, a gear 275, such as a pinion gear, may be configured to mesh with and drive over the ring gear 273 to facilitate rotatable coupling of the upper carriage assembly 112 to the undercarriage assembly 110.

Figure 4A:
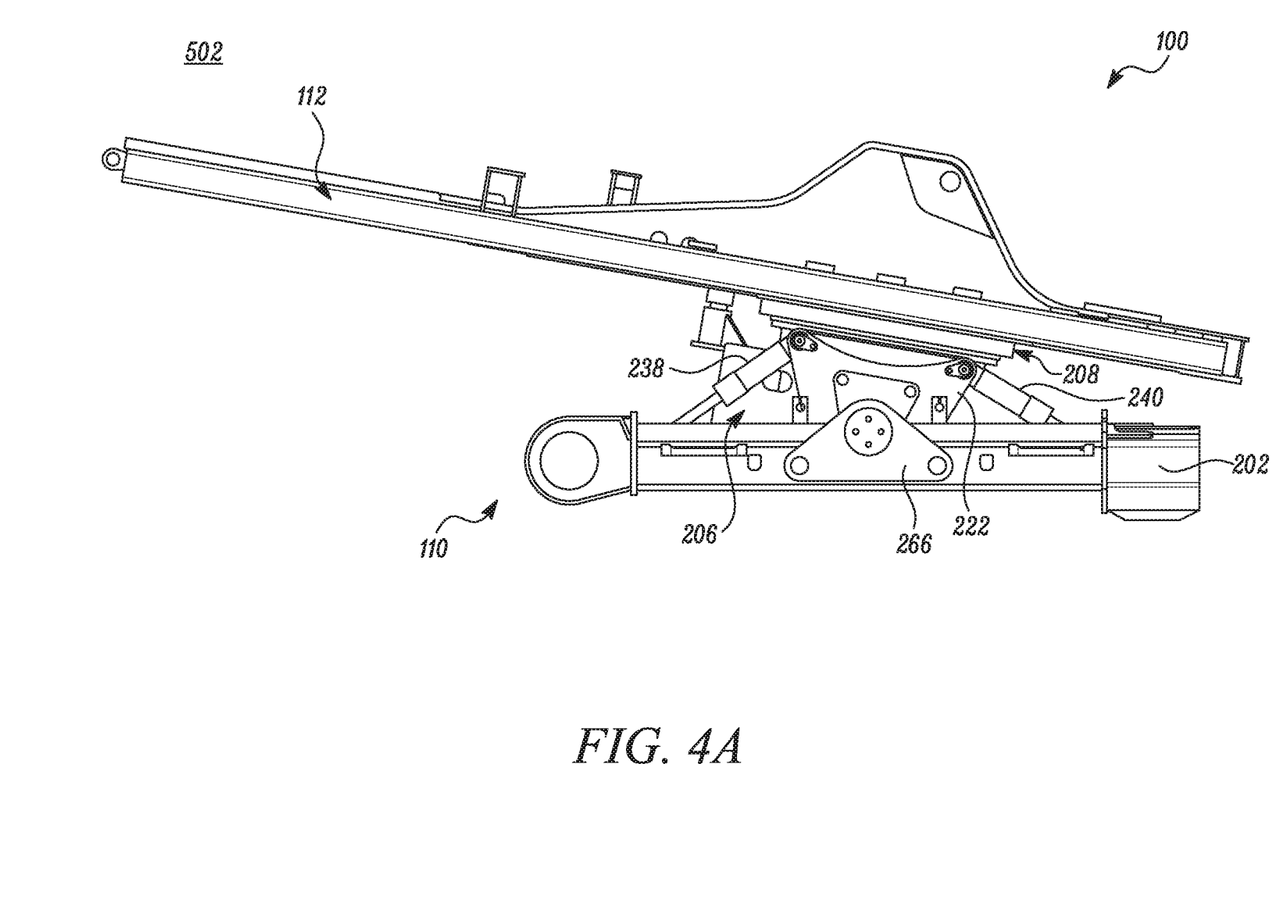
FIGS. 4A and 4B illustrate fore and aft tilted position of the levelling assembly respectively, in accordance with the embodiments of the present disclosure.
Figure 4B:
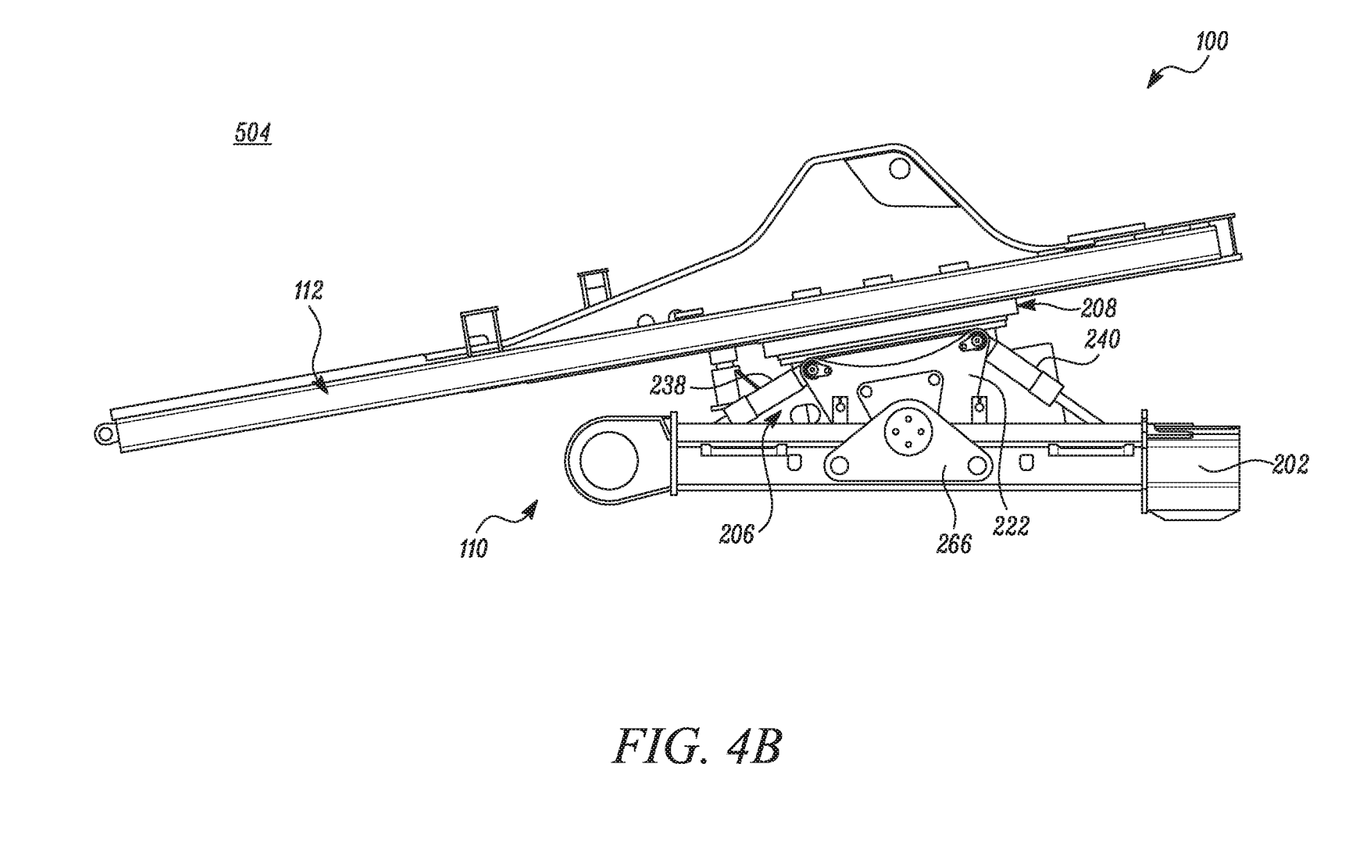

Referring to FIGS. 4A and 4B, during operation of the machine 100, the first pair of fluid actuators 238, 240 and the second pair fluid actuators 242, 244 together work in conjunction to pivot the levelling body 208 about the connecting rod 260 and move it between a fore tilted position 502 (as shown in FIG. 4A) and an aft tilted position 504 (as shown in FIG. 4B). Therefore, by moving between the fore tilted position 502 and the aft tilted position 504, the levelling assembly 206 levels the upper carriage assembly 112 in a horizontal position, during operation at an inclined surface of the worksite 102.

Further, according to an embodiment of the present disclosure, when one of the first fluid actuators 238, 242 and the second fluid actuators 240, 244 in the pair of actuators expands then the other one of the first fluid actuators 238, 242 and the second fluid actuators 240, 244 in the pair of actuators provides a compensatory reaction and commensurate retraction to the expansion to support and facilitate a smooth movement of the levelling body 212 between the fore tilted position 502 and the aft tilted position 504. For example, in the first pair of fluid actuators 238, 240, when the first fluid actuator 238 expands then the second fluid actuator 240 provides a compensatory reaction and commensurate retraction to the expansion of the first fluid actuator 238. Similarly, when the second fluid actuator 240 expands then the first fluid actuator 238 provides a compensatory reaction and commensurate retraction corresponding to the expansion of the second fluid actuator 240.

Figure 8:
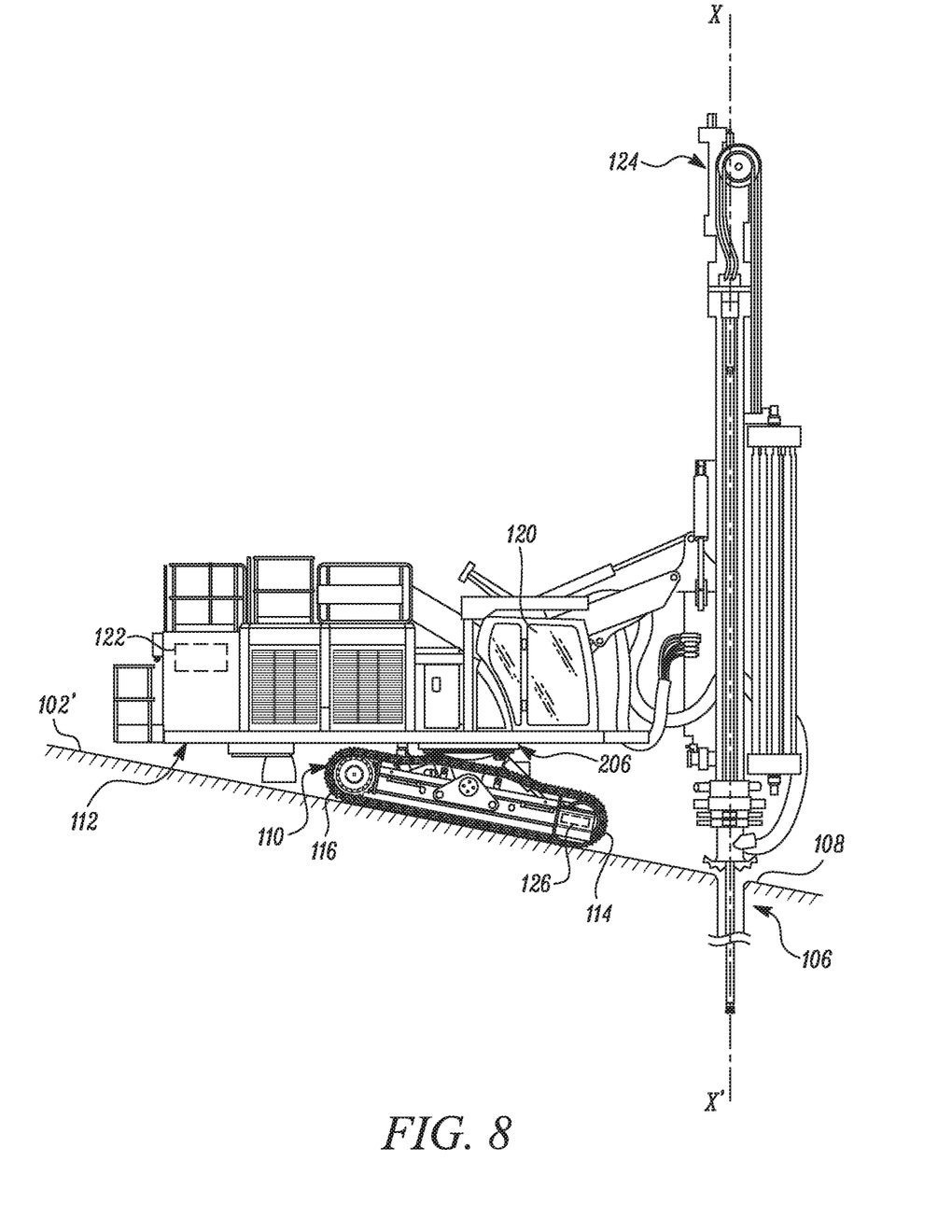
FIG. 8 illustrates the machine having a levelled upper carriage assembly relative to the undercarriage assembly when the machine operates at an inclined surface, in accordance with the embodiments of the present disclosure.

Further, in the second pair of the fluid actuators 242, 244, when the third fluid actuator 242 expands then the fourth fluid actuator 244 provides the compensatory reaction and commensurate retraction to the expansion of the third fluid actuator 242. Similarly, when the fourth fluid actuator 244 expands then the third fluid actuator 242 provides a compensatory reaction and commensurate retraction corresponding to the expansion of the fourth fluid actuator 244. This expansion and retraction of the fluid actuators 238, 240, 242, 244 results in the movement of the levelling body 208 between the fore tilted position 502 and the aft tilted position 504. In one exemplary implementation, the expansion of the first fluid actuator 238 and the third fluid actuator 242 moves the levelling body 208 to the fore tilted position 502, as shown in FIG. 4A, whereas the expansion of the second fluid actuator 240 and the fourth fluid actuator 244 moves the levelling body 208 to the aft tilted position 504, as shown in FIG. 4B. The movement of the levelling body 208 between the fore and aft tilted positions 502, 504 provides for a tilting of the upper carriage assembly 112 relative to the undercarriage assembly 110 and assists with maintaining a horizontal position of the upper carriage assembly 112 when the machine 100 operates at an inclined surface of the worksite 102 (as shown in FIG. 8).

Figure 5:
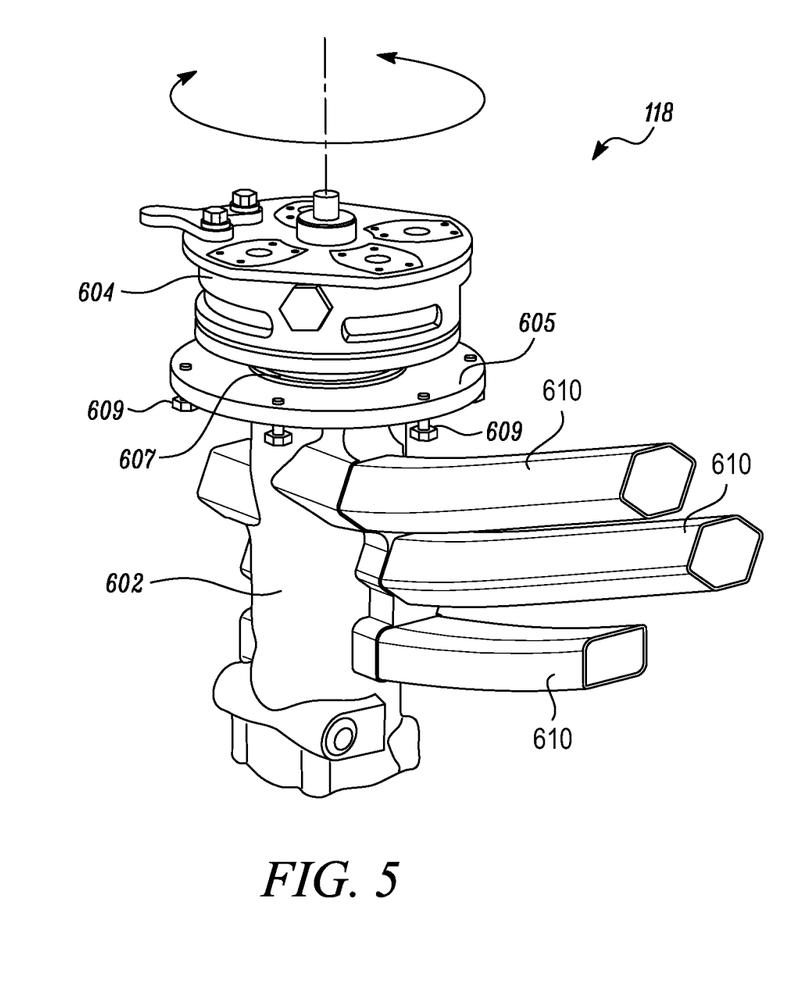
FIG. 5 illustrates an exemplary swivel system for providing 360 degrees rotation of an upper carriage assembly with respect to the undercarriage assembly, in accordance with the embodiments of the present disclosure.
Figure 6:
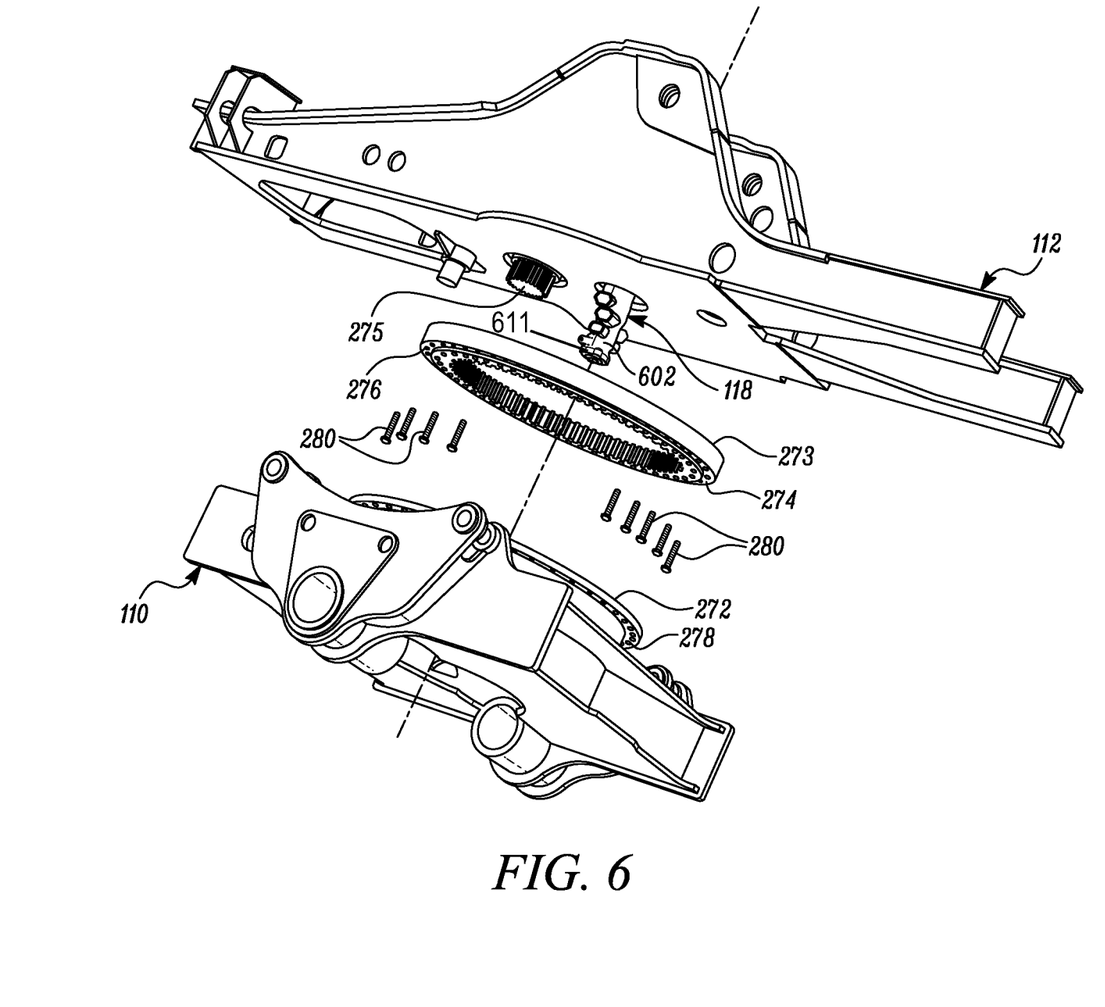
FIG. 6 illustrates an exploded view of the coupling of the undercarriage assembly, the swivel system and the upper carriage assembly with some components of the undercarriage assembly and upper carriage assembly removed, in accordance with the embodiments of the present disclosure.

Referring to FIGS. 5 and 6, an exemplary swivel system 118 of the undercarriage assembly 110 is illustrated. In an embodiment of the present disclosure, the swivel system 118 is configured to facilitate 360 degrees of rotation of the upper carriage assembly 112 with respect to the undercarriage assembly 110. During operation, the upper carriage assembly 112 may rotate up to 360 degrees in order to perform drilling operations at various locations surrounding the machine 100 without moving the machine 100 from one location to another.

Figure 7:
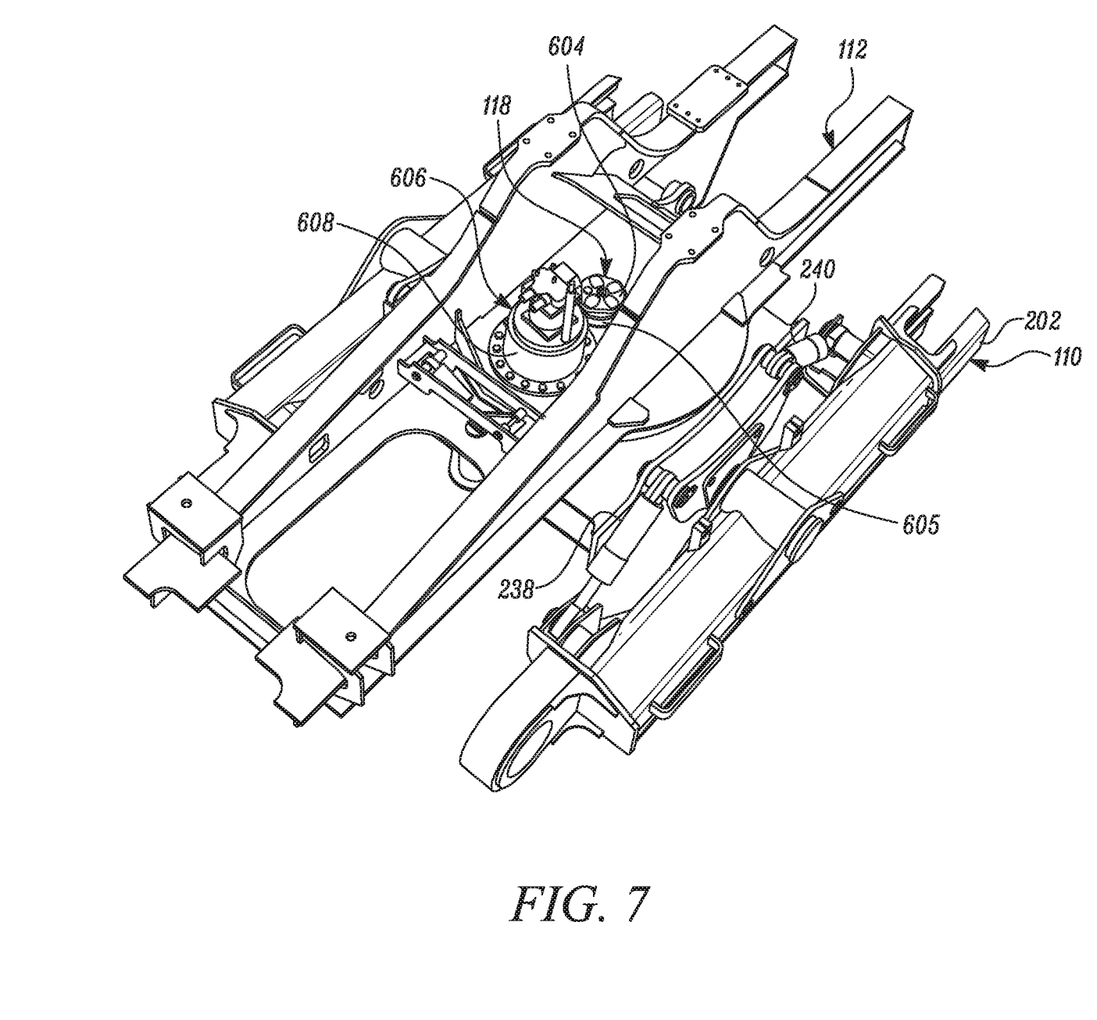
FIG. 7 illustrates a perspective view of the undercarriage assembly including the swivel system with some components of the upper carriage and undercarriage assembly removed, in accordance with the present disclosure.

To this end, the swivel system 118 includes a first swivel portion 602 and a second swivel portion 604 rotatable with respect to the first swivel portion 602. The second swivel portion 604 is connected to the upper carriage assembly 112, as shown in FIGS. 6 and 7, while the first swivel portion 602 is connected to the undercarriage assembly 110 for rotatably coupling the upper carriage assembly 112 with the undercarriage assembly 110. For example, the swivel system 118 may include a coupling plate 605 coupled to the second swivel portion 604 and having a receptacle 607. The coupling plate 605 is coupled to the upper carriage assembly 112 (as shown in FIG. 7), by using fasteners 609, thereby coupling the second swivel portion 604 to the upper carriage assembly 112. The receptacle 607 on the coupling plate 605 is configured to couple with a first end of the first swivel portion 602, thereby coupling the first and the second swivel portions 602, 604 together and in turn coupling the swivel system 118 to the upper carriage assembly 112. Further, the first swivel portion 602 may also include a second end 611 (as shown in FIG. 6) that is coupled to a receptacle (not shown) provided on the undercarriage assembly 110, thereby coupling the swivel system 118 to the undercarriage assembly 112. In various exemplary implementations, the coupling of the first swivel portion 602 with the coupling plate 605 as well as the undercarriage assembly 110 may be in the form of threaded coupling or clasp lock coupling or the like.

The machine 100 may further include a swing system 606 (shown in FIG. 7) that works in conjunction with the swivel system 118 to rotate the upper carriage assembly 112 up to 360 degrees relative to the undercarriage assembly 110. The swing system 606 may include a swing motor 608 and a swing pump (not shown), where the swing pump may be operatively coupled to the power source 122 and may be configured to receive some amount of torque to pressurize a fluid and provide the pressurized fluid to the swing motor 608 for the swing motor 608 to function, and through one or more hoses 610, to the first swivel portion 602 of the swivel system 118 for rotating the second swivel portion 604 and consequently the upper carriage assembly 112 relative to the undercarriage assembly 110.

In an embodiment of the present disclosure, the first swivel portion 602 receives and stores the pressurized fluid from the swing pump. The pressurized fluid stored within the first swivel portion 602 is then supplied to the second swivel portion 604, thereby powering the 360 degrees rotation of the second swivel portion 604 with respect to the first swivel portion 602. Since the second swivel portion 604 may rotates independently of the first swivel portion 602, the second swivel portion 604 is capable of rotating entirely up to 360 degrees without entangling the hoses 610 that are attached to the first swivel portion 602 of the swivel system 118. In that manner, the second swivel portion 604 facilitates 360 degrees rotation of the upper carriage assembly 112 of the machine 100 during the operation of the machine 100.

INDUSTRIAL APPLICABILITY

The present disclosure provides the undercarriage assembly 110 having a levelling assembly 206 and a swivel system 118 for facilitating levelling and 360 degrees rotation of the upper carriage assembly 112, when the machine 100 operates at a worksite 102.

The swivel system 118 according to the embodiments of the present disclosure, facilitates independent rotation of the second swivel portion 604 without rotating the first swivel portion 602 and the connected hoses 610, thereby facilitating up to 360 degrees rotation of the second swivel system 604 and consequently the connected upper carriage assembly 112. Therefore, while rotating the upper carriage assembly 112, the hoses 610 do not move from their original position, thereby eliminating the risk of entangling of the hoses 610 which would rather restrict the rotation of the upper carriage assembly 112 up to only a few degrees.

Further, it may be appreciated by a person skilled in the art, that when the upper carriage assembly 112 of a drilling machine rotates, the center of gravity of the machine 100 changes. Therefore, during operation, it is desired to provide a balance to accommodate the change in center of gravity of the machine 100. The four fluid actuators 238, 240, 242, and 244 work in conjunction with one another to accommodate the disbalance and provide appropriate levelling to the upper carriage assembly 112 to maintain it in a horizontal position. More specifically, the expansion and compensatory retraction of the fluid actuators prevents jerks when the upper carriage assembly 112 tilts as the machine 100 operates at an inclined surface of the worksite 102 (as shown in FIG. 8).

Furthermore, the lower ends 238", 240", 242", 244" of the fluid actuators 238, 240, 242, 244 are positioned at a height H that is equal to or less than the height H1 of the longitudinal axis of the track roller frames 202, 204. The positioning of the lower ends 238", 240", 242", 244" of the fluid actuators 238, 240, 242, 244, the swivel system 118 and the levelling body 208 reduce the overall height of the machine 100 and accommodates the total height of the machine 100 within shipping limits permissible for a drilling machine.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A levelling assembly for levelling an upper carriage assembly of a machine with respect to an undercarriage assembly of the machine, the undercarriage assembly including a first track roller frame and a second track roller frame, the levelling assembly comprising:
    a levelling body being rotatably coupled to the first track roller frame and the second track roller frame, the levelling body defining a first side and a second side laterally opposite to the first side, the levelling body including an upper surface and a lower surface defining a thickness thereof, the levelling body including a swing receptacle extending through the thickness of the levelling body;
    a swivel system received in the swing receptacle, the swivel system configured to extend through the upper carriage assembly and facilitate 360 degrees rotation of the upper carriage assembly relative to the undercarriage assembly of the machine;
    a first pair of fluid actuators for movably coupling the first side of the levelling body with the first track roller frame; and
    a second pair of fluid actuators for movably coupling the second side of the levelling body with the second track roller frame,
    wherein the first pair of fluid actuators and the second pair of fluid actuators are configured to move the levelling body between a fore tilted position and an aft tilted position relative to the first track roller frame and the second track roller frame.

2. The levelling assembly as claimed in claim 1, wherein each of the first pair of fluid actuators and the second pair of fluid actuators includes a first fluid actuator and a second fluid actuator, and wherein when one of the first fluid actuator and the second fluid actuator expands then the other one of the first fluid actuator and the second fluid actuator provides a compensatory reaction, thereby moving the levelling body between the fore tilted position and the aft tilted position.

3. The levelling assembly as claimed in claim 1, wherein the levelling body includes:
    a first bracket provided on the first side for coupling the first pair of fluid actuators to the first side of the levelling body; and
    a second bracket provided on the second side for coupling the second pair of fluid actuators to the second side of the levelling body.

4. The levelling assembly as claimed in claim 3, wherein each of the first bracket and the second bracket includes:
    a lower end having a receptacle; and
    an upper end having a pair of coupling members for coupling the respective pair of fluid actuators to the levelling body.

5. The levelling assembly as claimed in claim 4 further includes a connecting rod having a first end and a second end, the connecting rod being configured to be received through each of the receptacles of the first bracket and the second bracket and couple to the first track roller frame at the first end and the second track roller frame at the second end, wherein the levelling body is configured to pivot about the connecting rod between the fore tilted position and the aft tilted position.

6. An undercarriage assembly for a machine having an upper carriage assembly rotatably mounted on the undercarriage assembly, the undercarriage assembly comprising:
    a first track roller frame and a second track roller frame;
    a levelling assembly including:
        a levelling body being rotatably coupled to the first track roller frame and the second track roller frame, the levelling body defining a first side and a second side laterally opposite to the first side;
        a first pair of fluid actuators for movably coupling the first side of the levelling body with the first track roller frame; and a second pair of fluid actuators for movably coupling the second side of the levelling body with the second track roller frame, wherein the first pair of fluid actuators and the second pair of fluid actuators are configured to move the levelling body between a fore tilted position and an aft tilted position relative to the first track roller frame and the second track roller frame;

a swivel system positioned within the levelling assembly, the swivel system including:

a first swivel portion and a second swivel portion being rotatable with respect to the first swivel portion, the second swivel portion being connected to and configured to rotate the upper carriage assembly relative to the undercarriage assembly; and the swivel system including one or more hoses connected to the first swivel portion for supplying hydraulic fluid to the swivel system and wherein the second swivel portion is configured to extend through the upper carriage assembly and provide 360 degrees rotation of the upper carriage assembly in response to a hydraulic fluid actuation received from the one or more hoses.

7. The undercarriage assembly as claimed in claim 6, wherein each of the first pair of fluid actuators and the second pair of fluid actuators includes a first fluid actuator and a second fluid actuator, and wherein when one of the first fluid actuator and the second fluid actuator expands then the other one of the first fluid actuator and the second fluid actuator provides a compensatory reaction, thereby moving the levelling body between the fore tilted position and the aft tilted position.

8. The undercarriage assembly as claimed in claim 6, wherein the levelling body includes:

a first bracket provided on the first side for coupling the first pair of fluid actuators to the first side of the levelling body; and a second bracket provided on the second side for coupling the second pair of fluid actuators to the second side of the levelling body.

9. The undercarriage assembly as claimed in claim 8, wherein each of the first bracket and the second bracket includes:

a lower end having a receptacle; and an upper end having a pair of coupling members for coupling the respective pair of fluid actuators to the levelling body.

10. The undercarriage assembly as claimed in claim 9, wherein the levelling assembly further includes a connecting rod having a first end and a second end, the connecting rod being configured to be received through each of the receptacles of the first bracket and the second bracket and couple to the first track roller frame at the first end and the second track roller frame at the second end, wherein the levelling body is configured to pivot about the connecting rod between the fore tilted position and the aft tilted position.

11. The undercarriage assembly as claimed in claim 6, wherein the levelling body includes an upper surface and a lower surface defining a thickness thereof, and wherein the levelling body includes a swing receptacle extending through the thickness of the levelling body.

12. The undercarriage assembly as claimed in claim 11, wherein each of the first track roller frame and the second track roller frame define a respective longitudinal axis and wherein each of the first and the second pair of fluid actuators are coupled to the respective track roller frames at a height less than or equal to a height of the longitudinal axis.

13. A machine comprising:

an undercarriage assembly including at least a first track roller frame and a second track roller frame;

an upper carriage assembly rotatably mounted on the undercarriage assembly;

a levelling assembly for levelling the upper carriage assembly with respect to the undercarriage assembly, the levelling assembly including:

a levelling body being rotatably coupled to the first track roller frame and the second track roller frame, the levelling body defining a first side and a second side laterally opposite to the first side and including a first bracket provided on the first side and a second bracket provided on the second side;

a first pair of fluid actuators for movably coupling the first bracket of the levelling body with the first track roller frame; and a second pair of fluid actuators for movably coupling the second bracket of the levelling body with the second track roller frame, wherein the first pair of fluid actuators and the second pair of fluid actuators are configured to move the levelling body between a fore tilted position and an aft tilted position relative to the first track roller frame and the second track roller frame; and a swivel system positioned within the levelling assembly and configured to facilitate 360 degrees rotation of the upper carriage assembly with respect to the undercarriage assembly, the swivel system including:

a first swivel portion;

one or more hoses connected to the first swivel portion for supplying hydraulic fluid to the swivel system; and a second swivel portion being rotatable with respect to the first swivel portion, the second swivel portion extending through the upper carriage assembly, the second swivel portion being connected to and configured to rotate the upper carriage assembly relative to the undercarriage assembly in response to a hydraulic fluid actuation received from the one or more hoses.

14. The machine as claimed in claim 13, wherein each of the first pair of fluid actuators and the second pair of fluid actuators includes a first fluid actuator and a second fluid actuator, and wherein when one of the first fluid actuator and the second fluid actuator expands then the other one of the first fluid actuator and the second fluid actuator provides a compensatory reaction, thereby moving the levelling body between the fore tilted position and the aft tilted position.

15. The machine as claimed in claim 13, wherein each of the first bracket and the second bracket includes:

a lower end having a receptacle; and an upper end having a pair of coupling members for coupling the respective pair of fluid actuators to the levelling body.

16. The machine as claimed in claim 15, wherein the levelling assembly further includes a connecting rod having a first end and a second end, the connecting rod being configured to be received through each of the receptacles of the first bracket and the second bracket and couple to the first track roller frame at the first end and the second track roller frame at the second end, wherein the levelling body is configured to pivot about the connecting rod between the fore tilted position and the aft tilted position.

17. The machine as claimed in claim 13, wherein each of the first track roller frame and the second track roller frame defines a respective longitudinal axis and wherein each of the first and the second pair of fluid actuators are coupled to the respective track roller frames at a height less than or equal to a height of the longitudinal axis.

* * * * *